Dec. 24, 1968   J. F. McDERMOTT   3,417,534
STRUCTURAL METAL PANEL
Filed Jan. 18, 1967
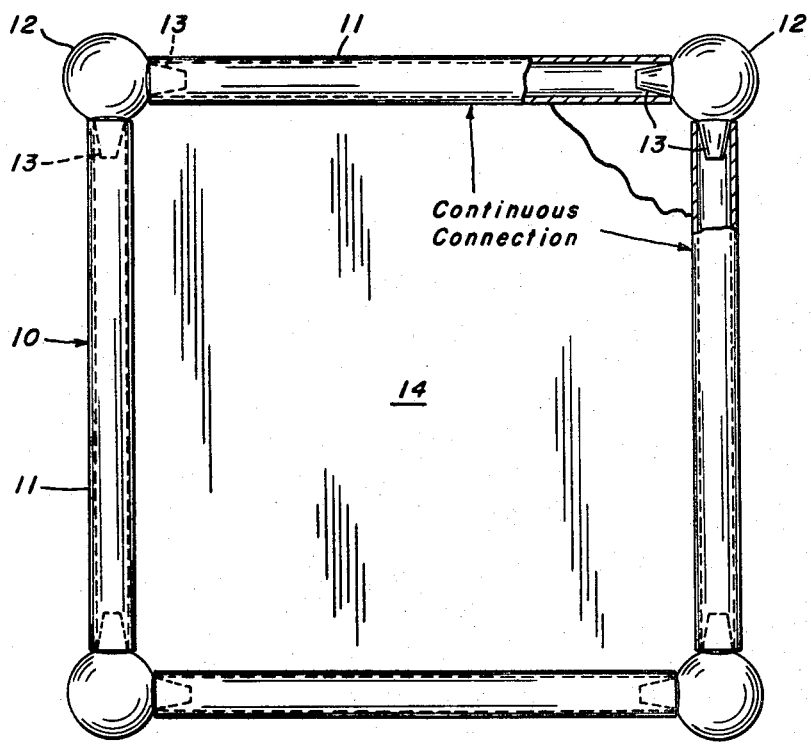
INVENTOR.
JOHN F. McDERMOTT
By Donald G. Dalton
Attorney 3,417,534
STRUCTURAL METAL PANEL
John F. McDermott, Monroeville, Pa., assignor to United
States Steel Corporation, a corporation of Delaware
Filed Jan. 18, 1967, Ser. No. 610,180
1 Claim. (Cl. 52—624)

ABSTRACT OF THE DISCLOSURE

A polygon formed of pipe lengths has balls at the corners with studs extending into the ends of the pipe lengths. A sheet secured laterally to the pipe lengths completes the panel and maintains it is assembled relation.

---

This invention relates to a structural unit in the form of a metal panel and, in particular, to a panel formed from pipe lengths connected end to end.

In the fabrication of metal shells that can be geometrically defined by families of straight lines, such as hyperbolic-paraboloidal roofs, panels utilizing pipe lengths as edge members may be employed and it is the object of my invention to provide such a panel having a wide range of applicability, which may readily be constructed at relatively low cost. More specifically, my invention concerns the connections between the ends of the pipe lengths, the objective being a connection which can be made without tools and is permanent when the panel is completed yet will readily permit the panel to change shape, as from a flat shape to a hyperbolic-paraboloidal shape. These objects I achieve by a ball member with studs serving as pivot bearings for the ends of adjacent pipe lengths, and by joining said lengths through a sheet secured laterally to the lengths.

The most pertinent prior art of which I am aware is found in U.S. Patents 1,946,408 and 2,351,419.

A complete understanding of the invention may be obtained from the following detailed description and explanation which refer to the accompanying drawing, the single figure of which is a plan view of a panel embodying my invention.

Referring now in detail to the drawing, a polygon 10 is formed by pipe lengths 11 joined at their ends. Each joint between adjacent pipe lengths comprises a ball 12 having tapering studs 13 extending radially thereof at the angle determined by the positions of the lengths to be connected. The ends of the pipe lengths fit loosely on the studs 13 with freedom for limited angular movement in any direction, that is, the maximum diameter of the studs is slightly less than the inside diameter of the pipe lengths. At all angular positions, however, the ends of the lengths seat firmly on one of the balls 12 to transmit compressive stress and the studs prevent any large movement of the pipe lengths in a direction transverse to the studs.

A sheet 14 of metal is secured in any convenient manner as by welding or soldering to the inner sides of the pipe lengths 11. This sheet serves a dual function. It closes the panel and holds the frame members (pipe lengths) thereof together. Assembly of the pipe lengths and their joints, obviously, must precede attachment of the sheet thereto but after this has been effected, the assembly of pipe lengths can be broken down only by rupture of the sheet. If it is desired that the panel readily change shape, as from a flat shape to a hyperbolic-paraboloidal shape, it will generally be desirable that sheet 14 be corrugated before the assembly.

It will be evident that, for ease of connection between adjacent panels, the balls 12 may have additional studs beyond the two shown. A continuum of adjacent interconnected panels can thus be formed by the same procedure as described above.

Panels according to my invention are particularly useful in forming models with an "adjustable warp" to permit with only one specimen the nondestructive testing of hyperbolic paraboloids with several different degrees of warp. Panels according to my invention may also be used in structural space frames where partitions are desirable and in other structural forms, as well as in roof construction.

Although I have disclosed herein the preferred embodiment of my invention, I intend to cover as well any change or modification therein which may be made without departing from the spirit and scope of the invention as set forth in the claim.

I claim:
1. A structural panel comprising a plurality of pipe lengths disposed as the sides of a polygon, a connection between the ends of each pair of adjacent lengths including a ball having a spherical surface, the free ends of the lengths having abutting contact with said surface, said ball having studs extending radially thereof and into said ends, said studs having a maximum diameter less than the inside diameter of the pipe lengths, and a sheet overlying the polygon and secured to the said pipe lengths whereby the ends of the pipe lengths are maintained in engagement with the surfaces of said balls.

References Cited

UNITED STATES PATENTS

| | | | |
|---|---|---|---|
| 1,946,408 | 2/1934 | Loudy | 287—189.36 |
| 2,351,419 | 6/1944 | Fuller | 52—222 |
| 2,891,491 | 6/1959 | Richter | 52—81 |
| 2,995,797 | 8/1961 | Hoffmann | 52—81 X |
| 3,192,669 | 7/1965 | Hawkins | 52—81 |
| 3,333,375 | 8/1967 | Johnston | 52—81 |

FRANK L. ABBOTT, *Primary Examiner.*

ALFRED C. PERHAM, *Assistant Examiner.*

U.S. Cl. X.R.

52—613, 280, 81